United States Patent [19]

Naito

[11] Patent Number: 6,034,812

[45] Date of Patent: Mar. 7, 2000

[54] GAIN EQUALIZER AND OPTICAL TRANSMISSION SYSTEM HAVING THE GAIN EQUALIZER

[75] Inventor: Takao Naito, Kawasaki, Japan

[73] Assignee: Fujitsu Limited, Kawasaki, Japan

[21] Appl. No.: 09/017,673

[22] Filed: Feb. 3, 1998

[30] Foreign Application Priority Data

Sep. 12, 1997 [JP] Japan .................................. 9-248248

[51] Int. Cl.[7] .................................................... H01S 3/06
[52] U.S. Cl. ........................... 359/341; 359/161; 359/124
[58] Field of Search ................................... 359/341, 161, 359/124

[56] References Cited

U.S. PATENT DOCUMENTS

| 5,912,750 | 6/1999 | Takeda et al. | 359/124 |
| 5,920,424 | 7/1999 | Espindola et al. | 359/341 |

OTHER PUBLICATIONS

First Optoelectronics and Communications Conference (OECC '96) Technical Digest, Jul. 1996, Makuhari Messe, "85–Gb/s WDM Transmission Experiment over 7931 km Using Gain Equalization to Compensate for Asymmetry in EDFA Gain Characteristics", Takao Naito, et al., pp. 4–5.

OFC '97 Technical Digest, Conference on Optical Fiber Communications, "128–Gbit/s WDM Transmission of 24 5.3–Gbit/s RZ Signals Over 7828 km Using Gain Equalization to Compensate for Asymmetry in EDFA Gain Characteristics", Takao Naito, et al., pp. 45–46.

*Primary Examiner*—Mark Hellner
*Attorney, Agent, or Firm*—Staas & Halsey LLP

[57] ABSTRACT

A gain equalizer for an optical amplifier having a gain characteristic giving a gain peak. The gain equalizer includes first, second, and third gain equalizers operatively connected to the optical amplifier. The first gain equalizer has a first loss characteristic (wavelength dependence of loss) giving a maximum loss at or near a wavelength giving the gain peak. The second and third gain equalizers have periodic second and third loss characteristics, respectively. The period of the second loss characteristic is shorter than the period of the third loss characteristic. Each of the second and third loss characteristics gives a maximum loss at or near a wavelength giving one of two gain peaks remaining when the gain characteristic of the optical amplifier is equalized by the first gain equalizer only. With this configuration, gain equalization can be performed with high accuracy. The loss characteristic required by each of the three gain equalizers is simple, so that the configuration of each gain equalizer can be simplified.

21 Claims, 16 Drawing Sheets

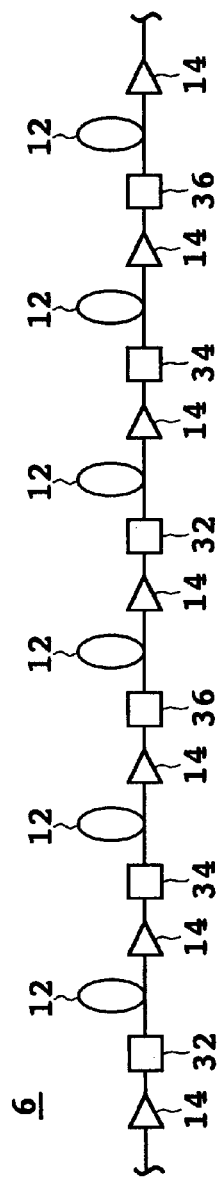
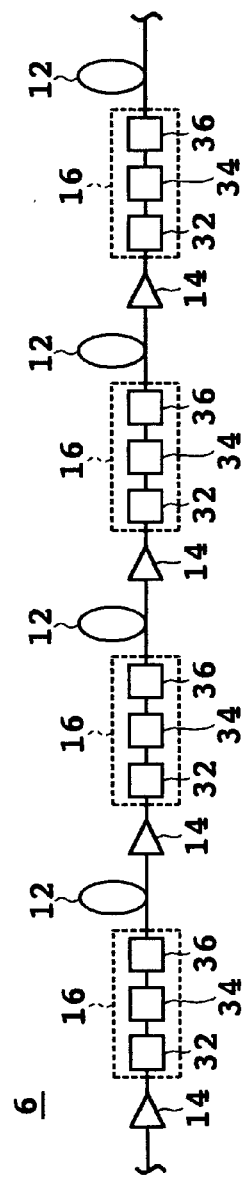

GAIN EQUALIZER AND OPTICAL TRANSMISSION SYSTEM HAVING THE GAIN EQUALIZER

BACKGROUND OF THE INVENTION

1. Field of the Invention

The present invention relates generally to gain equalization suitable for optical fiber communication using wavelength division multiplexed signal light including a plurality of channels of optical carriers having different wavelengths, and more particularly to combined gain equalizers and an optical transmission system having the combined gain equalizers.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light. For example, an erbium doped fiber amplifier (EDFA) includes an erbium doped fiber (EDF) as the optical amplifying medium and a pump light source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by a gain characteristic (wavelength dependence of gain) which is represented by a gain deviation or gain tilt. For example, in an EDFA, a gain deviation is produced at wavelengths in the vicinity of 1.55 $\mu$m. When a plurality of EDFAs are cascaded to cause accumulation of gain deviations, an optical SNR (signal-to-noise ratio) in a channel included in a band giving a small gain is degraded.

To cope with the gain deviation of an optical amplifier, a gain equalizer configured by a passive optical component such as an optical filter is used. Before a degradation in optical SNR in a certain channel becomes excessive due to accumulation of gain deviations, gain equalization is performed by the gain equalizer provided at a suitable position.

In the case that one kind of gain equalizer is used, the accuracy of gain equalization is low on the basis of the fact that an optical filter as the gain equalizer generally has a simple periodic loss characteristic (wavelength dependence of loss) or a loss characteristic having a single peak. While it has been proposed to combine two kinds of gain equalizers, the accuracy of gain equalization is not necessarily sufficient in some case. Further, it may be proposed to combine five or more kinds of optical filters and design a loss characteristic matching the gain characteristic of an optical amplifier. In this case, however, the gain equalizer is complicated in configuration, and the loss becomes high. The use of one kind of gain equalizer or the use of two kinds of gain equalizers in combination will be hereinafter described in the section of DETAILED DESCRIPTION OF THE PREFERRED EMBODIMENTS in comparison with the present invention.

SUMMARY OF THE INVENTION

It is therefore an object of the present invention to provide a gain equalizer having a high accuracy of gain equalization and a simple configuration.

It is another object of the present invention to provide a novel optical transmission system including such a gain equalizer.

In accordance with a first aspect of the present invention, there is provided a gain equalizer for an optical amplifier having a gain characteristic (wavelength dependence of gain) giving a gain peak. This gain equalizer comprises first, second, and third gain equalizers operatively connected to the optical amplifier. The first gain equalizer has a first loss characteristic (wavelength dependence of loss) giving a maximum loss at or near a wavelength giving the gain peak. The second and third gain equalizers have periodic second and third loss characteristics, respectively. The period of the second loss characteristic is shorter than the period of the third loss characteristic. Each of the second and third loss characteristics gives a maximum loss at or near a wavelength giving one of two gain peaks remaining when the gain characteristic of the optical amplifier is equalized by the first gain equalizer only.

With this configuration, gain equalization can be performed with high accuracy because the three gain equalizers having specific loss characteristics are combined. Further, the loss characteristic required by each of the three gain equalizers is simple, so that the configuration of each gain equalizer can be simplified. In particular, a filter such as a Fabry-Perot etalon filter having a periodic loss characteristic and a simple configuration may be used as each of the second and third gain equalizers.

In this specification, the wording that an element and another element are operatively connected includes the case that these elements are directly connected, and also includes the case that these elements are so provided as to be related with each other to such an extent that an electrical signal or an optical signal can be mutually transferred between these elements.

In accordance with a second aspect of the present invention, there is provided an optical transmission system comprising an optical fiber span including an optical amplifier having a gain characteristic giving a gain peak and first, second, and third gain equalizers operatively connected to the optical amplifier. The first, second, and third gain equalizers have first, second, and third loss characteristics, respectively, similar to those in the gain equalizer according to the first aspect of the present invention.

Preferably, this system further comprises a first terminal station for supplying signal light to the optical fiber span at one end of the optical fiber span, and a second terminal station for receiving the signal light from the optical fiber span at the other end of the optical fiber span.

For example, the signal light comprises wavelength division multiplexed (WDM) signal light including a plurality of channels of optical carriers having different wavelengths. In this case, the gain characteristic of the optical amplifier may be determined in relation to a band of the WDM signal light.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 16A and 16B are diagrams showing different forms of application of a plurality of gain equalizers according to the present invention.

DETAILED DESCRIPTION OF THE PREFERRED EMBODIMENTS

Some preferred embodiments of the present invention will now be described in detail with reference to the attached drawings.

Figure 1:
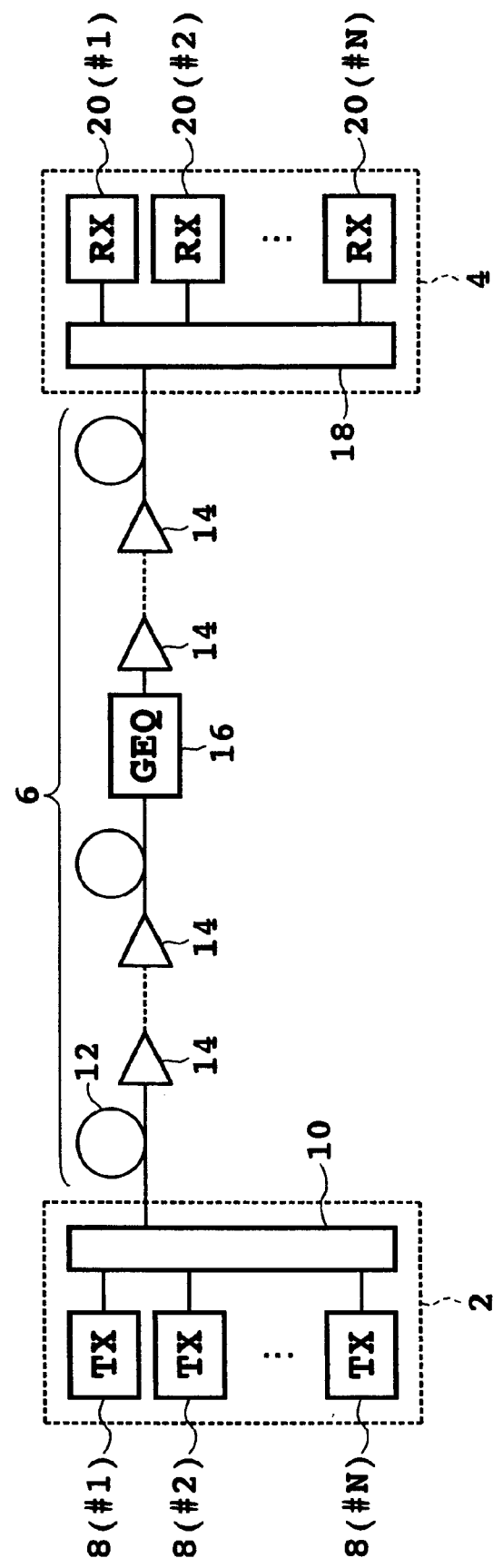
FIG. 1 is a block diagram of an optical transmission system to which the present invention is applicable.

FIG. 1 is a block diagram of an optical transmission system to which the present invention is applicable. This system includes a first terminal station or equipment 2 for transmission, a second terminal station or equipment 4 for reception, and an optical fiber span 6 laid between the terminal stations 2 and 4. The first terminal station 2 includes a plurality of optical transmitters (TX) 8 (#1 to #N) for outputting optical signals having different wavelengths, and an optical multiplexer 10 for wavelength division multiplexing these optical signals to obtain WDM signal light. The WDM signal light is supplied to the optical fiber span 6. The optical fiber span 6 includes an optical fiber transmission line 12 and a plurality of in-line optical amplifiers 14 provided on the optical fiber transmission line 12. At least one gain equalizer (GEQ) 16 is provided in the optical fiber span 6 to compensate for gain deviation by the optical amplifiers 14. The second terminal station 4 includes an optical demultiplexer 18 for separating the WDM signal light from the optical fiber span 6 according to wavelength to obtain optical signals in individual channels, and a plurality of optical receivers (RX) 20 (#1 to #N) for receiving these optical signals.

According to the configuration shown in FIG. 1, a transmission capacity can be increased according to the number of channels because wavelength division multiplexing (WDM) is applied. Further, long-haul transmission can be achieved with a simple configuration because the optical amplifiers 14 are adopted as optical repeaters.

Figure 2:
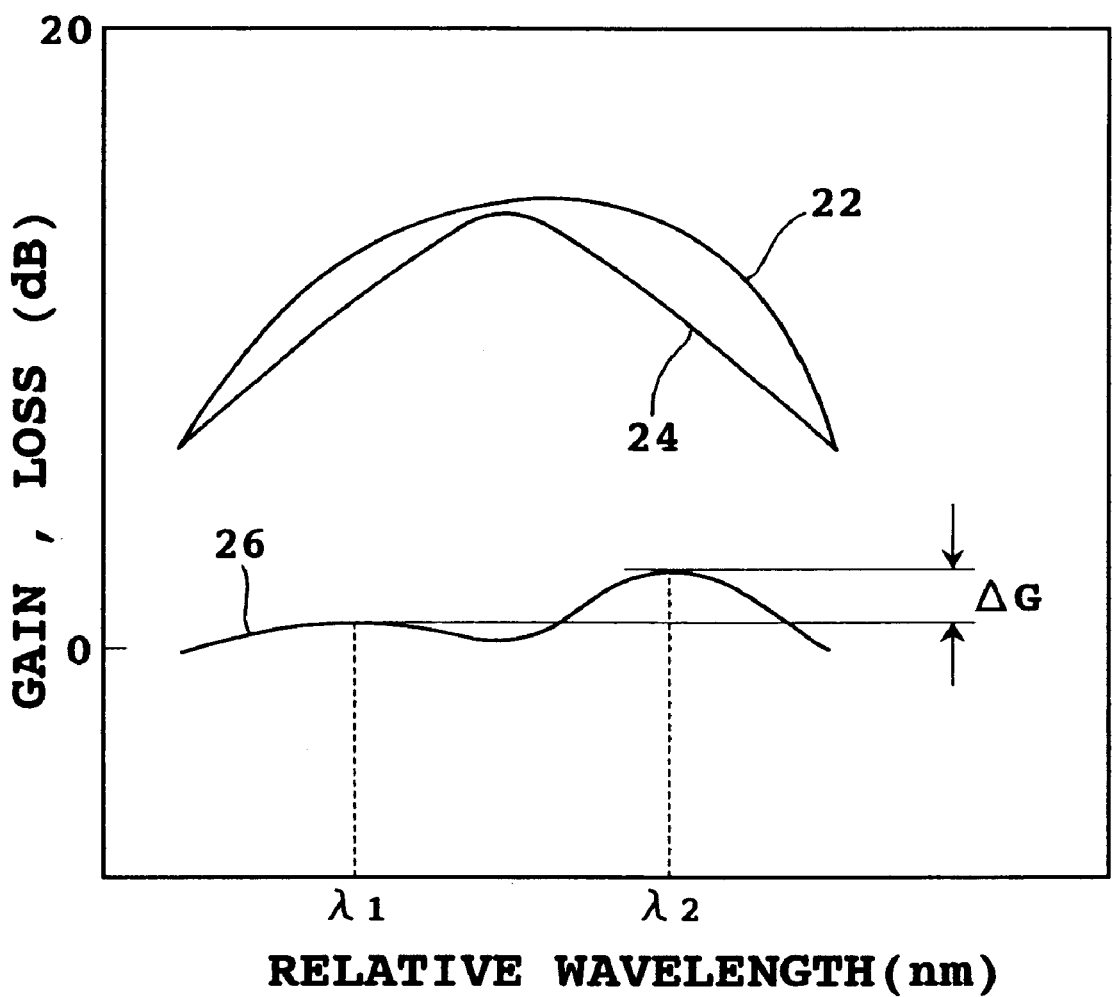
FIG. 2 is a graph illustrating gain equalization by one kind of gain equalizer in the prior art.

Referring to FIG. 2, there is shown a manner of gain equalization in the case that one kind of gain equalizer (optical filter) is used as the gain equalizer 16 (in the prior art). In FIG. 2, the vertical axis represents gain and loss (dB), and the horizontal axis represents relative wavelength (nm). As the one kind of gain equalizer, at least one gain equalizer is provided in the optical fiber span 6 so that gain is equalized by the gain equalizer before an optical SNR in a certain channel becomes excessive. In FIG. 2, reference numeral 22 denotes the gain characteristic (wavelength dependence of gain) of an optical amplifier whose gain is to be equalized by the gain equalizer, and reference numeral 24 denotes the loss characteristic (wavelength dependence of loss) of the gain equalizer. In this case, the gain characteristic 22 is gentler than the loss characteristic 24, so that a periodic gain deviation 26 remains after gain equalizer. That is, the gain of the optical amplifier and the loss of the gain equalizer are canceled each other at a shortest wavelength, at a longest wavelength, and at a wavelength substantially intermediate between the shortest wavelength and the longest wavelength (an intermediate wavelength) in a band giving the gain characteristic 22, and two gain peaks remain at a wavelength $\lambda_1$ between the shortest wavelength and the intermediate wavelength and at a wavelength $\lambda_2$ between the intermediate wavelength and the longest wavelength. Because the gain characteristic 22 is asymmetrical and the loss characteristic 24 is generally symmetrical, an imbalance $\Delta G$ is produced between the two gain peaks, so that the remaining gain characteristic 26 becomes asymmetrical. In this manner, the periodicity and the asymmetry of the remaining gain characteristic become a problem in the case of using one kind of gain equalizer.

In view of such a problem, the use of two kinds of gain equalizers in combination has been proposed.

Figure 3:
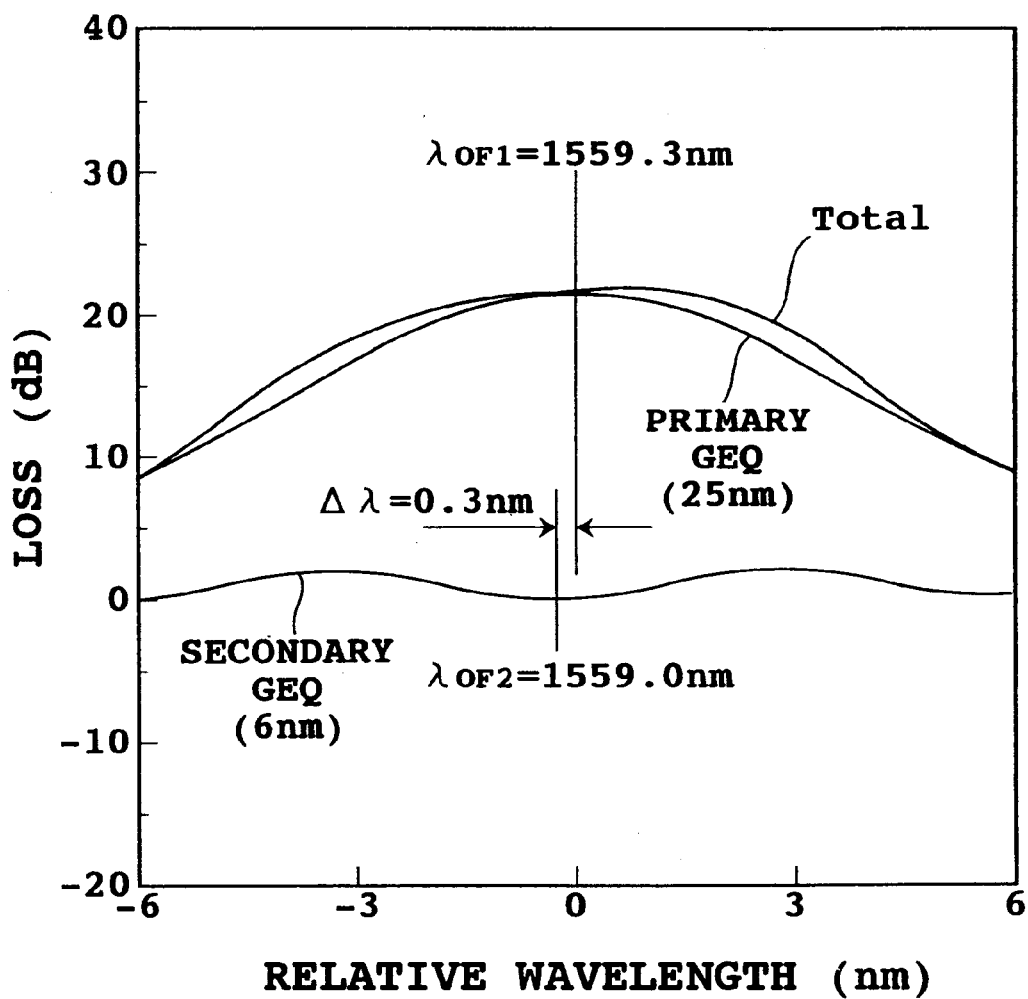
FIG. 3 is a graph showing a loss characteristic by the combination of two kinds of gain equalizers in the prior art.

Referring to FIG. 3, there is shown a loss characteristic by the combination of two kinds of gain equalizers (in the prior art). In FIG. 3, the vertical axis represents loss (dB), and the horizontal axis represents relative wavelength (nm). In this case, a gain equalizer having a loss characteristic with a period of 25 nm is used as a primary gain equalizer (primary GEQ), and a gain equalizer having a loss characteristic with a period of 6 nm is used as a secondary gain equalizer (secondary GEQ). The maximum loss wavelength $\lambda_{OF1}$ of the primary GEQ is 1559.3 nm, and the minimum loss wavelength $\Delta_{OF2}$ of the secondary GEQ is 1559.0 nm. Thus, an offset wavelength $\Delta\lambda$ corresponding to the difference therebetween is set to 0.3 nm. As a result, a combined loss characteristic as shown by "Total" is obtained.

The primary GEQ is used for the purpose of compensating for the gain characteristic or gain deviation of an optical amplifier as similarly to the case of using one kind of gain equalizer as mentioned with reference to FIG. 2. The secondary GEQ is used for the purpose of compensating for a periodic gain deviation remaining after the compensation by the primary GEQ. Further, the offset wavelength $\Delta\lambda$ is set for the purpose of compensating for asymmetry in the remaining gain deviation.

Additional details of the combination of two kinds of gain equalizers mentioned with reference to FIG. 3 is described in T. Naito et al., "85-Gb/s WDM transmission experiment over 7931 km using gain equalization to compensate for asymmetry in EDF gain characteristics", First Optoelectronics and Communications Conference (OECC '96) Technical Digest, July 1996, PD1-2.

In the combination of two kinds of gain equalizers mentioned with reference to FIG. 3, there is a case that the accuracy of gain equalization is not necessarily high. More specifically, there is a case that the compensation for periodicity and asymmetry in the gain characteristic remaining after the compensation by the primary GEQ becomes incomplete.

Figure 4:
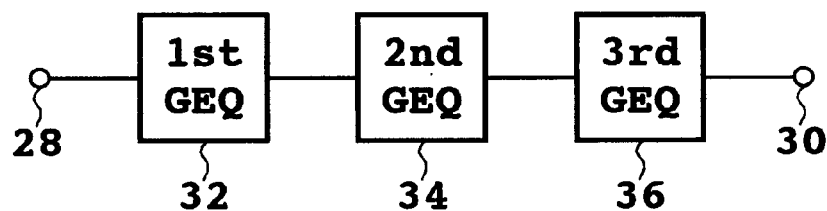
FIG. 4 is a block diagram showing a first preferred embodiment of the gain equalizer according to the present invention.

FIG. 4 is a block diagram showing a first preferred embodiment of the gain equalizer according to the present invention. This gain equalizer is configured by cascading a first gain equalizer (1st GEQ) 32, a second gain equalizer (2nd GEQ) 34, and a third gain equalizer (3rd GEQ) 36 between an input port 28 and an output port 30. The order of arrangement of the gain equalizers 32, 34, and 36 is arbitrary. The combination of the gain equalizers 32, 34, and 36 shown in FIG. 4 may be used as the gain equalizer 16 shown in FIG. 1. Although the system shown in FIG. 1 includes the single gain equalizer 16, a plurality of gain equalizers 16 (each having the configuration shown in FIG. 4) may be provided in the optical fiber span 6. Alternatively, the first, second, and third gain equalizers 32, 34, and 36 may be dispersively located at different positions in the optical fiber span 6.

In the case that the optical amplifier 14 whose gain is to be equalized has the gain characteristic 22 giving a gain peak shown in FIG. 2, the first gain equalizer 32 has a loss characteristic giving a maximum loss at or near a wavelength giving the gain peak. The loss characteristic is shown by reference numeral 24 in FIG. 2, for example.

Figure 5:
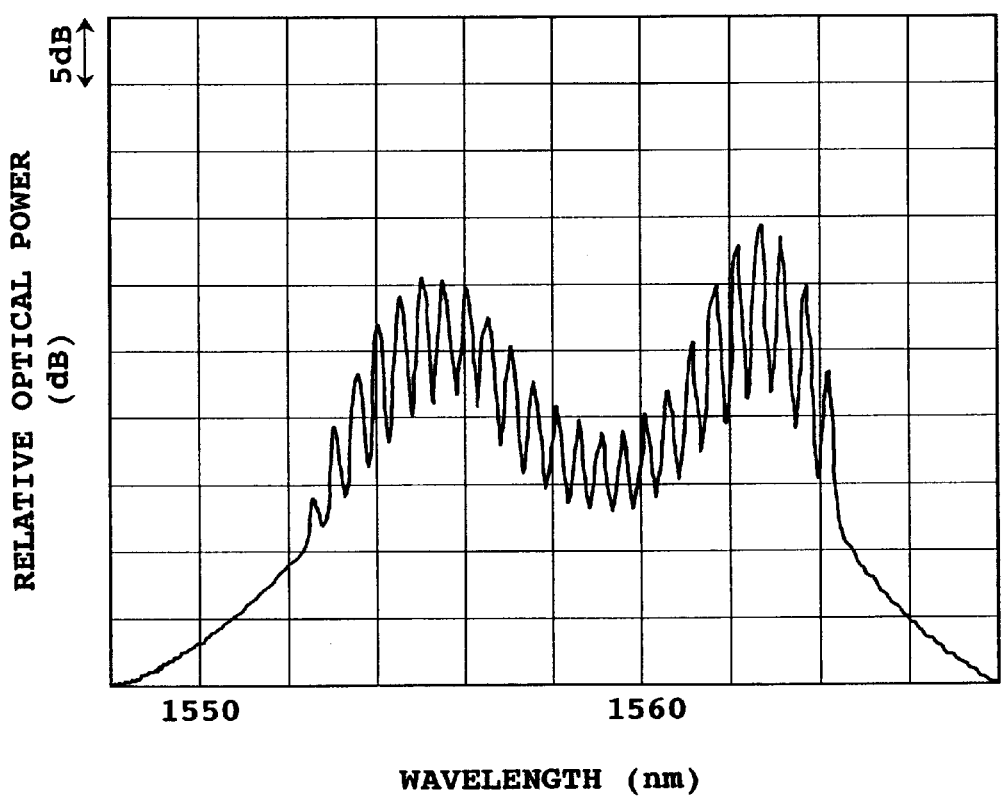
FIG. 5 is a graph showing an optical spectrum after transmission.

Referring to FIG. 5, there is shown an example of an optical spectrum after transmission in the case that the optical fiber span 6 shown in FIG. 1 includes the first gain equalizer 32 only shown in FIG. 4. In FIG. 5, the vertical axis represents relative optical power (dB), and the horizontal axis represents wavelength (nm). Each spacing on the vertical axis is 5 dB. In this case, 24-channel wavelength division multiplexing is carried out; the bit rate in each channel is 5.3 Gb/s; the length of the optical fiber span 6 is 7828 km; and 55 first gain equalizers 32 are dispersively located in the optical fiber span 6.

Additional details of the experiment for obtaining the optical spectrum shown in FIG. 5 is described in T. Naito et al., "128-Gbit/s WDM transmission of 24 5.3-Gbit/s RZ signals over 7828 km using equalization to compensate for asymmetry in EDFA gain characteristics", Conference on Optical Fiber Communications (OFC) '97 Technical Digest, Feb 1997, Tuj 2.

Figure 6:
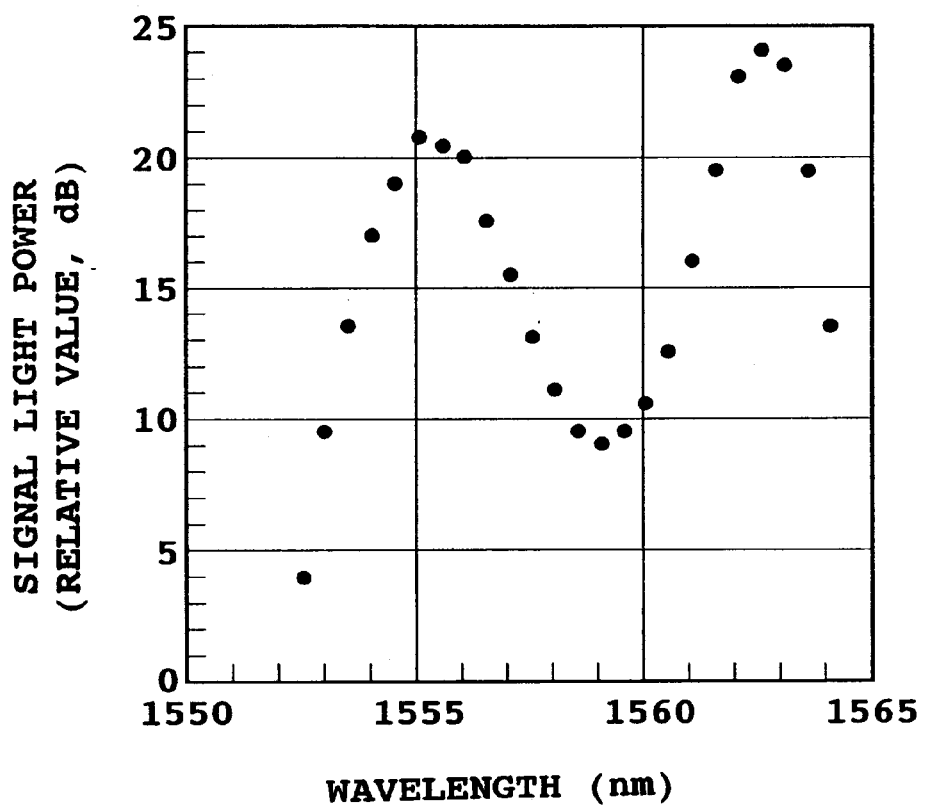
FIG. 6 is a graph showing signal light power in the optical spectrum shown in FIG. 5.

Referring to FIG. 6, there is shown the relation between signal light power (relative value, dB) and wavelength (nm) in the optical spectrum shown in FIG. 5. As apparent from FIGS. 5 and 6, two gain peaks (peaks of gain ripples) remain in the case that the gain characteristic is equalized by the first gain equalizer 32 only. The wavelength giving one of the two gain peaks is 1555 nm, and the wavelength giving the other gain peak is 1562.5 nm. Further, the difference in peak level between the two gain peaks is 4 dB, and the periodicity (or half width) of the gain deviation near the peak at the shorter wavelength is longer by about 1 nm than the periodicity (or half width) of the gain deviation near the peak at the longer wavelength.

There will now be described in detail the design of the loss characteristics of the second and third gain equalizers 34 and 36 for compensating for such remaining gain deviations.

Figure 7:
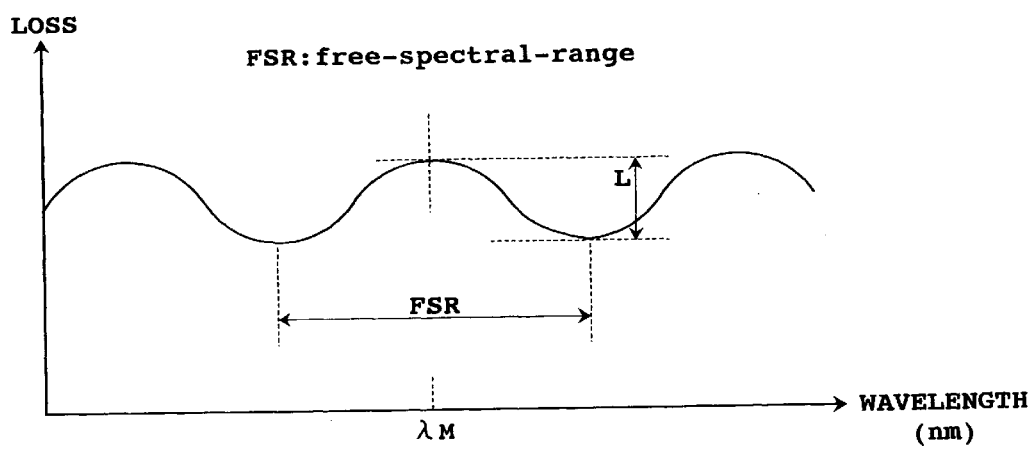
FIG. 7 is a graph showing a periodic loss characteristic in an optical filter.

FIG. 7 is a graph showing a periodic loss characteristic in an optical filter usable as each of the first, second, and third gain equalizers 32, 34, and 36 in the present invention. In FIG. 7, the vertical axis represents loss, and the horizontal axis represents wavelength (nm). In the loss characteristic, there are three important parameters as follows:

(1) FSR (free spectral range) giving the difference between a maximum loss wavelength and another maximum loss wavelength adjacent thereto.

(2) Difference between a maximum loss and a minimum loss (extinction ratio) L.

(3) Maximum loss wavelength $\lambda_M$.

It can also be said that FSR gives the period of the loss characteristic.

The loss characteristic $g(\lambda, \lambda_M, FSR, L)$ of a Fabry-Perot etalon type optical filter is given by the following expression.

$$g(\lambda, \lambda_M, FSR, L) = 10\log\{[1 - (1 - 10^{-L/20})/(1 + 10^{-L/20})]^2 / [[1 - (1 - 10^{-L/20})/(1 + 10^{-L/20})]^2 + [4 \times (1 - 10^{-L/20})/(1 + 10^{-L/20})] \times \cos^2[\pi(\lambda - \lambda_M)/FSR]\}$$

The loss characteristic $f(\lambda, \lambda_M, FSR, L)$ of a Mach-Zehnder type optical filter is given by the following expression.

$$f(\lambda, \lambda_M, FSR, L) = 10\log\{(1/4) \times [(1 + 10^{-L/20})^2 + (1 - 10^{-L/20})^2 - 2(1 + 10^{-L/20})(1 - 10^{-L/20})\cos[2\pi(\lambda - \lambda_M)/FSR]]\}$$

Accordingly, in the case of combining two kinds of optical filters (the second and third gain equalizers 34 and 36), six parameters are necessary. A suffix 2 will be attached to FSR, L, and $\lambda_M$ for the optical filter having a relatively short FSR, and a suffix 3 will be attached to FSR, L, and $\lambda_M$ for the optical filter having a relatively long FSR. In the configuration shown in FIG. 4, it is assumed that the second gain equalizer 34 has a relatively short FSR ($FSR_2$), and that the third gain equalizer 36 has a relatively long FSR ($FSR_3$)

In the case that gain equalization is carried out by the first gain equalizer 32 only and the remaining gain characteristic has two gain peaks as shown in FIGS. 5 and 6, it is rational to set $\lambda_{M2}$ and $\lambda_{M3}$ at or near a wavelength giving one of the two gain peaks. Preferably, $\lambda_{M2}$ and $\lambda_{M3}$ are set at or near a wavelength giving a larger one of the two gain peaks, so as to effectively utilize the maximum losses of the second and third gain equalizers 34 and 36.

More specifically, to compensate for the gain characteristic shown in FIGS. 5 and 6, the parameters in the second and third gain equalizers 34 and 36 are set as follows:

$\lambda_{M2}$ and $\lambda_{M3}$ are set at a wavelength (1562.5 nm) giving a gain peak on the longer wavelength side in the optical spectrum after transmission;

$FSR_2$ is normalized to 1;

$FSR_3$ is set as a parameter having a degree of freedom;

$L_2$ is set to $(2-L_3)$ dB; and $L_3$ is set as a parameter having a degree of freedom.

The reason why $L_2$ and $L_3$ are set above is to give a total loss of 2 dB at a wavelength giving a gain peak on the longer wavelength side.

In setting of the above parameters, there are two parameters each having a degree of freedom, i.e., $FSR_3$ and $L_3$ for the third gain equalizer 36 having a longer period. These two parameters are set so that the sum of the loss characteristics of the second and third gain equalizers 34 and 36 simultaneously satisfy the difference between the peak level on the shorter wavelength side and the peak level on the longer wavelength side in the gain characteristic remaining after gain equalization by the first gain equalizer 32 only and the difference between the period (half width) of the gain deviation on the shorter wavelength side and the period (half width) of the gain deviation on the longer wavelength side.

Figure 8:
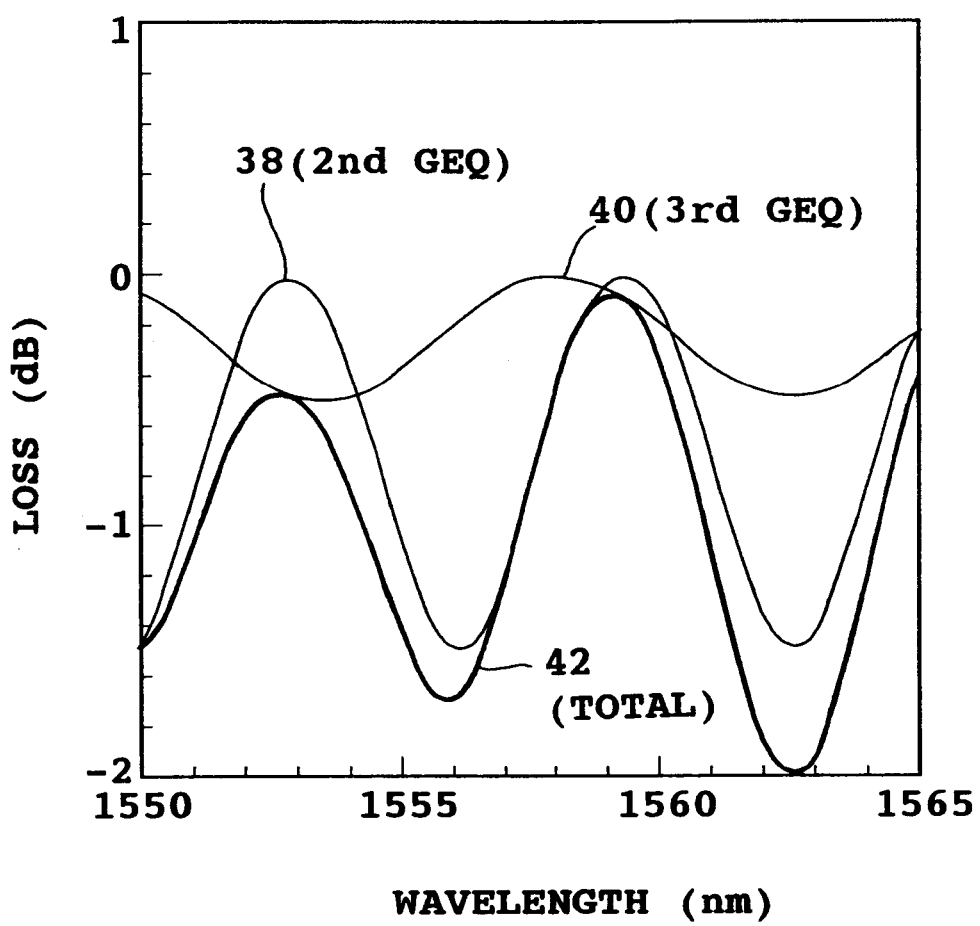
FIG. 8 is a graph showing an example of the design of the loss characteristic of second and third gain equalizers applicable to the present invention.

Referring to FIG. 8, there is shown an example of the design of the loss characteristics of the second and third gain equalizers 34 and 36. In FIG. 8, the vertical axis represents loss (dB), and the horizontal axis represents wavelength (nm). Further, reference numeral 38 denotes the loss characteristic of the second gain equalizer 34, reference numeral 40 denotes the loss characteristic of the third gain equalizer 36, and reference numeral 42 denotes the loss characteristic obtained by combining the second and third gain equalizers 34 and 36. In the case that $FSR_3$ is 1.4 times $FSR_2$, and that $L_2$ and $L_3$ are 1.5 dB and 0.5 dB, respectively, the difference between the peak level on the shorter wavelength side and the peak level on the longer wavelength side becomes about 4 dB. More specifically, in the case that a gain characteristic remains after gain equalization by the first gain equalizer 32 only as shown in FIGS. 5 and 6, the remaining gain characteristic can be equalized with high accuracy by setting $FSR_2$ to 6.5 nm, $FSR_3$ to 9.1 nm (1.4 times $FSR_2$), and $L_3$ to 0.5 dB.

Figure 9:
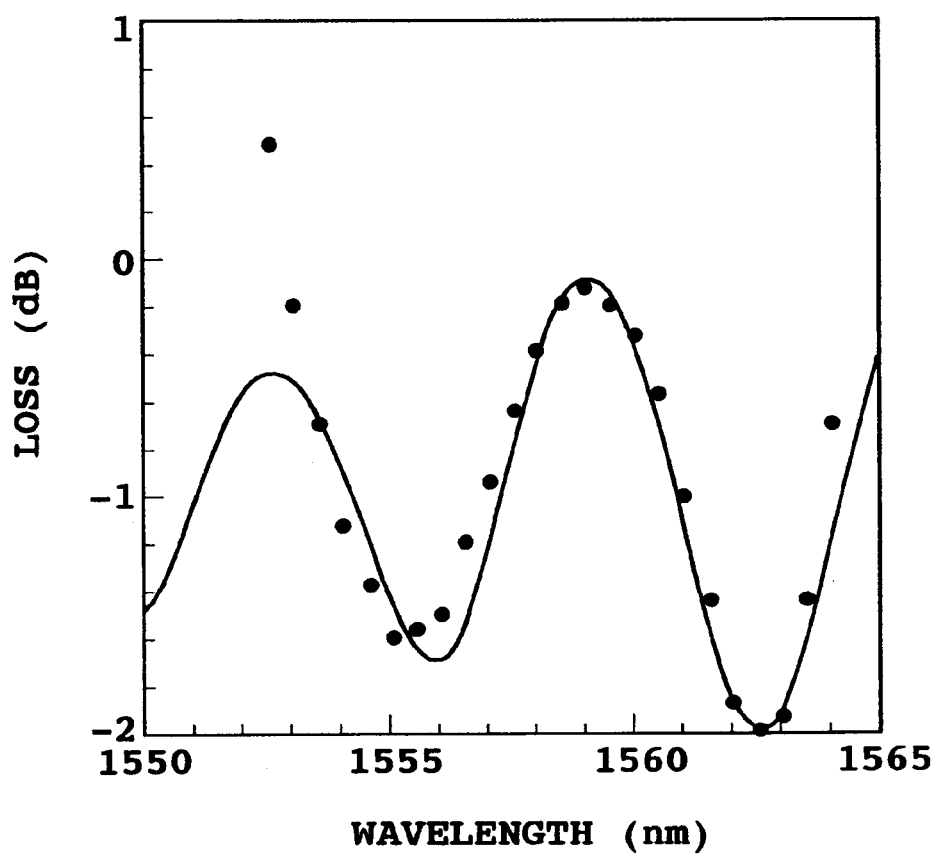
FIG. 9 is a graph showing the coincidence between design values and target values of the loss characteristics of the second and third gain equalizers.

Referring to FIG. 9, there is shown a plot of target values of a loss characteristic obtained from the signal power measured in FIGS. 5 and 6 in contrast with the loss characteristic obtained by combining the second and third gain equalizers 34 and 36 under the above-mentioned specific conditions. As apparent from FIG. 9, the loss characteristic obtained quite well coincides with the target values except the shorter-wavelength two channels.

The gain characteristic of the optical amplifier hereinbefore described is provided by a specific embodiment of an erbium doped fiber amplifier (EDFA). In general, the EDFA includes an erbium doped fiber (EDF) supplied with signal light to be amplified (e.g., WDM signal light obtained by wavelength division multiplexing a plurality of optical signals having different wavelengths) and a pump light source for pumping (exciting) the EDF so that the EDF provides a gain band including the wavelength of the signal light.

In the case that the signal light and the pump light propagate in the same direction from a first end of the EDF toward a second end of the EDF, the pumping is forward pumping. Conversely, in the case that the signal light propagates from the first end toward the second end and that the pump light propagates from the second end toward the first end, the pumping is backward pumping. In the case that two pump light sources or two branch outputs of one pump light source are optically connected to the first end and the second end of the EDF, the pumping is bidirectional pumping.

It is known that the gain band of the EDFA can be widened by doping the EDF with a high concentration of Al (aluminum).

In any case, the gain characteristic as mentioned with reference to FIGS. 5 and 6 remains in the EDFA after gain equalization by one kind of gain equalizer only. Therefore, the application of the gain equalizer according to the present invention to the EDFA allows high-accuracy gain equalization.

There will now be described design examples of the parameters in the second and third gain equalizers 34 and 36 suitable for the EDFA.

Figure 10:
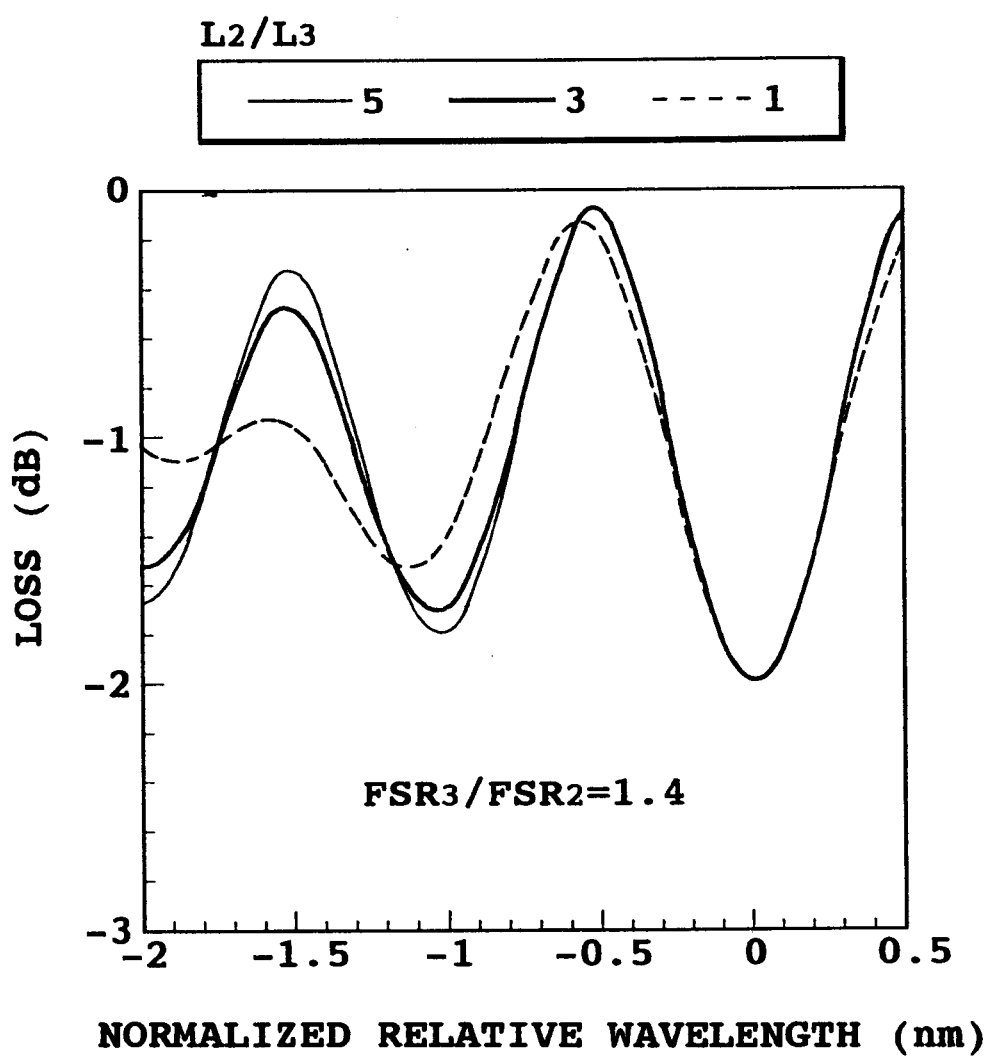
FIG. 10 is a graph showing an example of the characteristic of the gain equalizer according to the present invention suitable for an EDFA (erbium-doped fiber amplifier)

Referring to FIG. 10, there is shown a loss characteristic obtained by combining the second and third gain equalizers 34 and 36 under the conditions that $FSR_3/FSR_2$ is fixed to 1.4 and that $L_2/L_3$ is changed to 1, 3, and 5. In FIG. 10, the vertical axis represents loss (dB), and the horizontal axis represents relative wavelength (nm) normalized by $FSR_2$. The origin (0) of the normalized relative wavelength is provided by a wavelength giving a gain peak on the longer wavelength side. Roughly, it is understood that a wavelength giving a loss peak on the shorter wavelength side is changed by changing $L_2/L_3$. In FIG. 10, the broken line corresponds to the case that $L_2/L_3$ is 1, the thick solid line corresponds to the case that $L_2/L_3$ is 3, and the thin solid line corresponds to the case that $L_2/L_3$ is 5.

As apparent from FIG. 10, by setting $L_2/L_3$ in the range of 1 to 5, it is possible to obtain a loss characteristic which can equalize with high accuracy the gain characteristic remaining in the case of using only one kind of gain equalizer for an EDFA. Accordingly, by setting the difference between a maximum loss and a minimum loss given by the second gain equalizer 34 to a value 1 to 5 times the difference between a maximum loss and a minimum loss given by the third gain equalizer 36, it is possible to provide a gain equalizer which can perform high-accuracy gain equalization for an EDFA.

Figure 11:
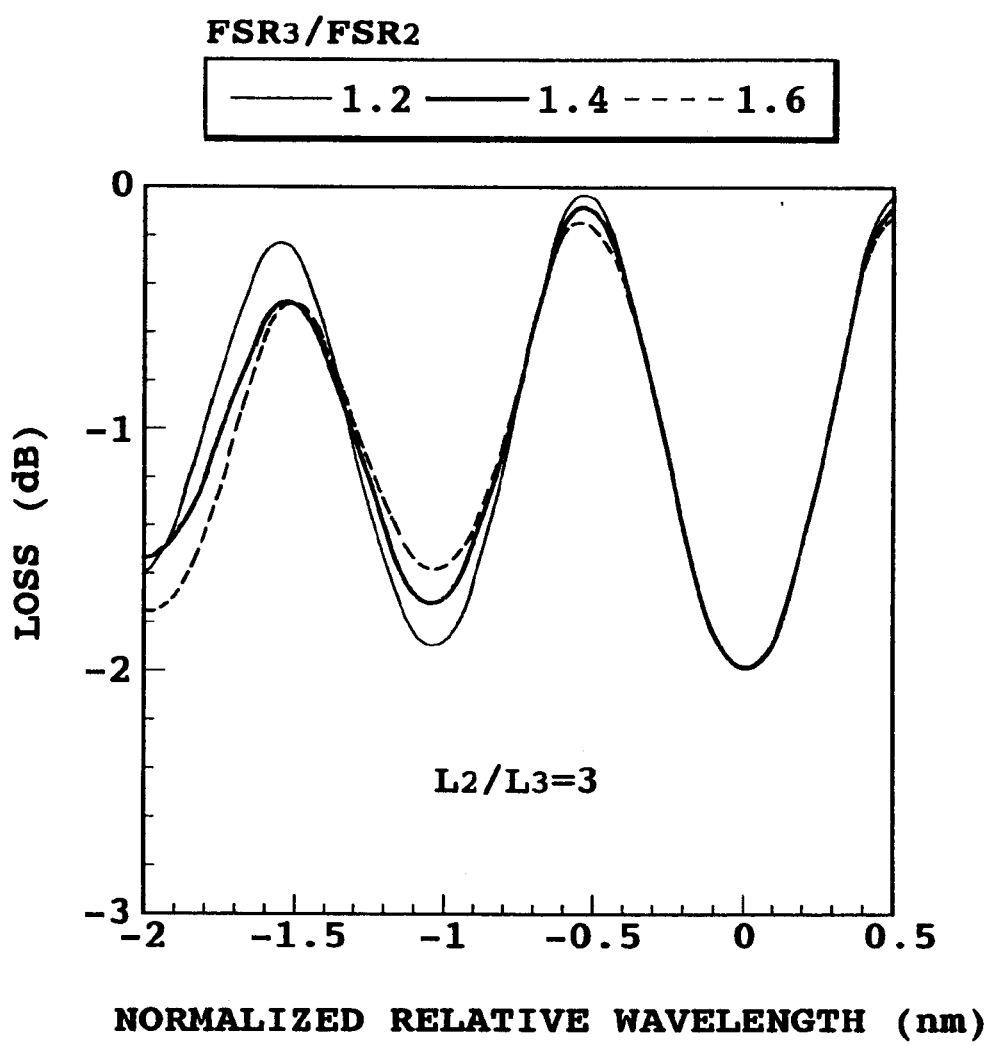
FIG. 11 is a graph showing another example of the characteristic of the gain equalizer according to the present invention suitable for an EDFA.

Referring to FIG. 11, there is shown a loss characteristic obtained by combining the second and third gain equalizers 34 and 36 under the conditions that $L_2/L_3$ is fixed to 3 and that $FSR_3/FSR_2$ is changed to 1.2, 1.4, and 1.6. In FIG. 11, the thin solid line corresponds to the case that $FSR_3/FSR_2$ is 1.2, the thick solid line corresponds to the case that $FSR_3/FSR_2$ is 1.4, and the broken line corresponds to $FSR_3/FSR_2$ is 1.6. As similar to FIG. 10, the vertical line represents loss (dB), and the horizontal axis represents normalized relative wavelength (nm). As apparent from FIG. 11, by setting $FSR_3/FSR_2$ in the range of 1.2 to 1.6, it is possible to equalize with high accuracy the gain characteristic remaining in the case of using only one kind of gain equalizer for an EDFA. Accordingly, by setting the period of the loss characteristic of the third gain equalizer 36 to a value 1.2 to 1.6 times the period of the loss characteristic of the second gain equalizer 34, it is possible to provide a gain equalizer which can perform high-accuracy gain equalization for an EDFA.

In the first preferred embodiment shown in FIG. 4, the first, second, and third gain equalizers 32, 34, and 36 are cascaded, so that the resultant loss characteristic is given by the sum of the loss characteristics of the gain equalizers 32, 34, and 36. Accordingly, the loss characteristic can be easily designed.

Figure 12:
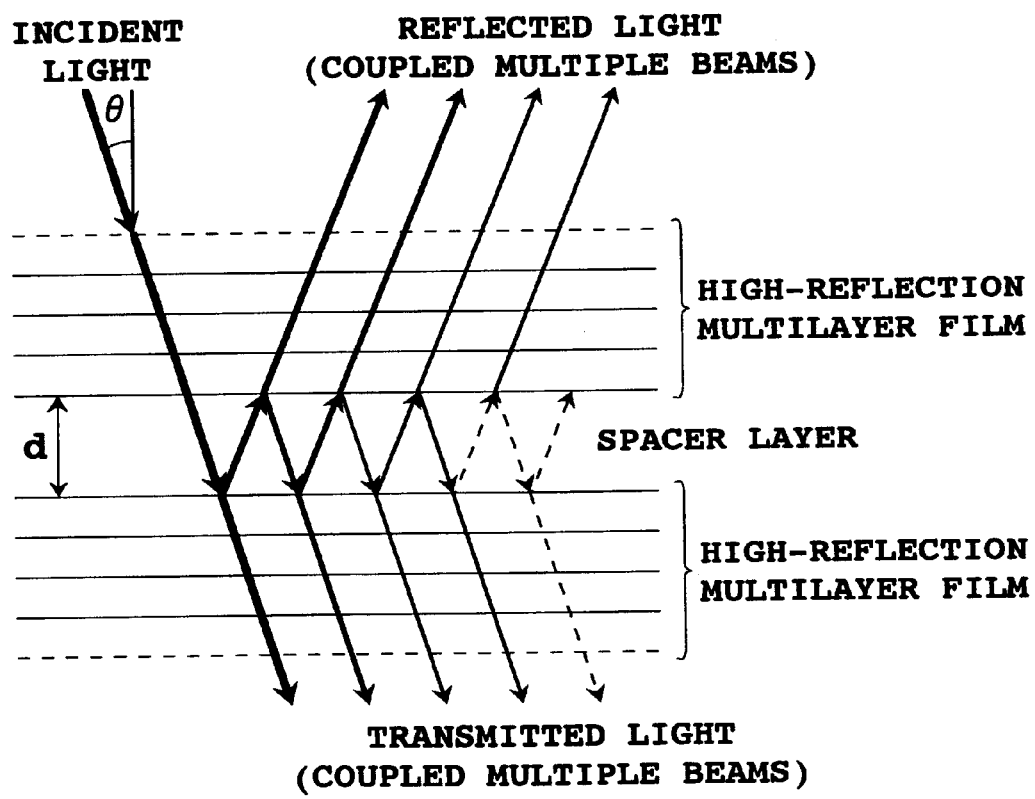
FIG. 12 is a view showing a basic structure of a Fabry-Perot etalon filter.

Referring to FIG. 12, there is shown a basic structure of a Fabry-Perot etalon filter usable as each of the first, second, and third gain equalizers 32, 34, and 36. The Fabry-Perot etalon filter is configured by sandwiching a spacer layer between a pair of high-reflection multilayer films. The pair of high-reflection multilayer films form a resonator having a resonance condition determined by the incidence angle θ of incident light and the thickness d of the spacer layer. When the wavelength of the incident light satisfies the resonance condition of the resonator, the transmittance of the incident light becomes maximum. When the incidence angle θ and the thickness d of the spacer layer are determined in this filter, the transmittance periodically becomes maximum according to wavelength. Accordingly, by adjusting the thickness d of the spacer layer etc. to configure the filter, a desired periodic loss characteristic as shown in FIG. 7 can be obtained.

As described above, according to the first preferred embodiment shown in FIG. 4, the gain characteristic remaining after equalization of the gain characteristic of the optical amplifier 14 by the first gain equalizer 32 is equalized by the second and third gain equalizers 34 and 36 having different FSRs (different periods of loss characteristics). Accordingly, high-accuracy gain equalization can be achieved as a whole, and a wide wavelength band of signal light can be obtained. Further, as each of the first, second, and third gain equalizers 32, 34, and 36, a passive optical component such as a Fabry-Perot etalon filter having a periodic loss characteristic and a simple configuration can be used. Accordingly, it is possible to provide a gain equalizer having a simple configuration.

Figure 13:
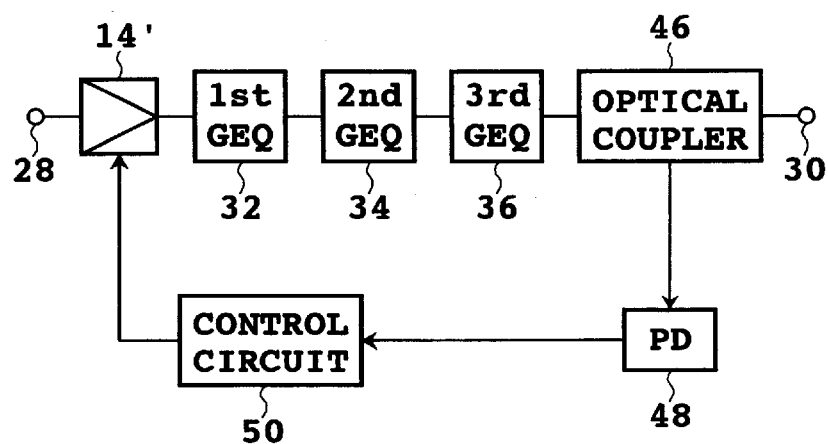
FIG. 13 is a block diagram showing a second preferred embodiment of the gain equalizer according to the present invention.

Referring to FIG. 13, there is shown a second preferred embodiment of the gain equalizer according to the present invention. In contrast with the first preferred embodiment shown in FIG. 4, the second preferred embodiment is characterized by addition of an optical amplifier 14' for loss compensation provided between the input port 28 and the first gain equalizer 32 and a feedback loop for controlling the gain of the optical amplifier 14'. The feedback loop includes an optical coupler 46 provided between the third gain equalizer 36 and the output port 30 for extracting branch light from output light, a photodetector (PD) 48 for receiving the branch light and outputting an electrical signal corresponding to the power of the branch light, and a control circuit 50 for controlling the gain of the optical amplifier 14' according to the electrical signal from the photodetector 48. By adopting such a feedback loop, an output level at the output port 30 can be maintained constant irrespective of variations in losses of the first, second, and third gain equalizers 32, 34, and 36.

Further, even when an input level at the input port 28 is low as the result of loss in the optical fiber transmission line 12 (see FIG. 1), the input level can be increased by the optical amplifier 14', thereby preventing a degradation in optical SNR due to the losses of the first, second, and third gain equalizers 32, 34, and 36.

Although a feedback loop as similar to that shown in FIG. 13 can be configured by providing the optical amplifier 14' between the third gain equalizer 36 and the optical coupler 46, the optical amplifier 14' is preferably provided between the input port 28 and the first gain equalizer 32 as shown in FIG. 13, so as to prevent a degradation in optical SNR due to a reduction in the input level.

In the case of using an EDFA as the optical amplifier 14', the gain can be controlled by an injection current to a laser diode used as the pump light source. Further, in the case of using a semiconductor optical amplifier as the optical amplifier 14', the gain can be controlled by a drive current to the semiconductor optical amplifier.

In general, the optical amplifier 14' also has a gain characteristic as similar to the optical amplifier 14'. Therefore, in designing the loss characteristics of the first, second, and third gain equalizers 32, 34, and 36, it is necessary to consider inclusion of the gain characteristic of the optical amplifier 14' in the gain characteristic of the optical amplifier 14.

Further, in the case that an EDFA is used as the optical amplifier 14', there is a possibility that a population inversion parameter in the EDF may change with a change in pump light power, causing a change in the gain characteristic. In the event that such a change in the gain characteristic exceeds a tolerance, the pump light power may be controlled so as to obtain a constant gain characteristic without adopting the feedback loop as shown in FIG. 13.

Figure 14:
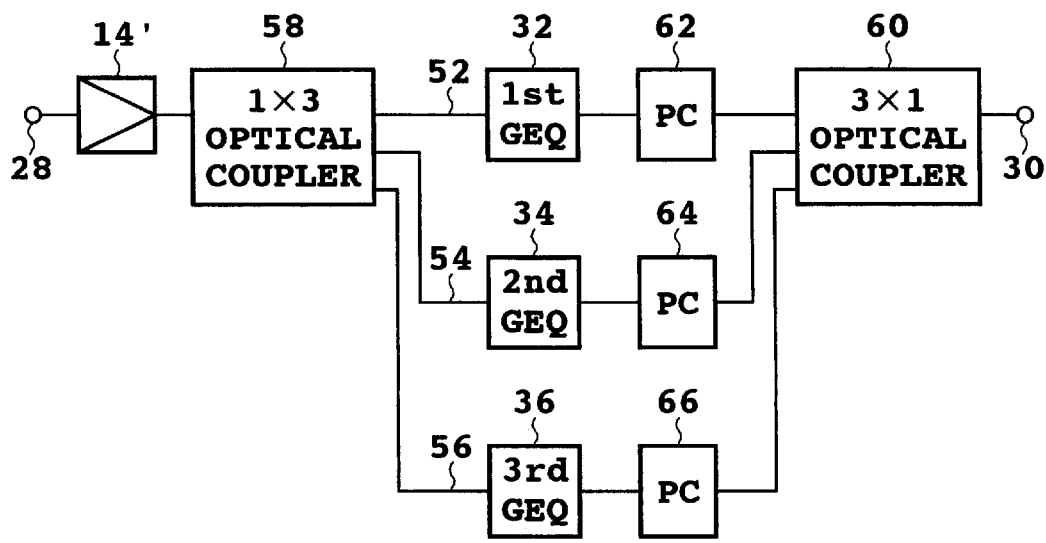
FIG. 14 is a block diagram showing a third preferred embodiment of the gain equalizer according to the present invention.

Referring to FIG. 14, there is shown a third preferred embodiment of the gain equalizer according to the present invention. In this preferred embodiment, a 1×3 optical coupler 58 is operatively connected to the input port 28 and a 3×1 optical coupler 60 is operatively connected to the output port 30, so as to form three parallel optical paths 52, 54, and 56 between the input port 28 and the output port 30. An optical amplifier 14' is provided between the input port 28 and the 1×3 optical coupler 58, so as to compensate for the loss by the optical fiber transmission line 12, and the gain characteristic of the optical amplifier 14' is maintained constant. The first, second, and third gain equalizers 32, 34, and 36 are provided in the optical paths 52, 54, and 56, respectively. Further, phase compensators (PC) 62, 64, and 66 are provided downstream of the gain equalizers 32, 34, and 36, respectively.

Signal light supplied is separated into three branch beams by the 1×3 optical coupler 58. The three branch beams are next subjected to gain equalization by the gain equalizers 32, 34, and 36, respectively, next adjusted in phase by the phase compensators 62, 64, and 66, and finally combined by the 3×1 optical coupler 60. Accordingly, high-accuracy gain equalization can be achieved by setting the loss characteristics of the gain equalizers 32, 34, and 36 according to the present invention.

The phase compensators 62, 64, and 66 are provided for the purpose of adjusting the phases of optical signals in the optical paths 52, 54, and 56. Accordingly, by suitably setting the path lengths of the optical paths 52, 54, and 56, any one or two of the phase compensators 62, 64, and 66 or all of them may be omitted.

Figure 15:
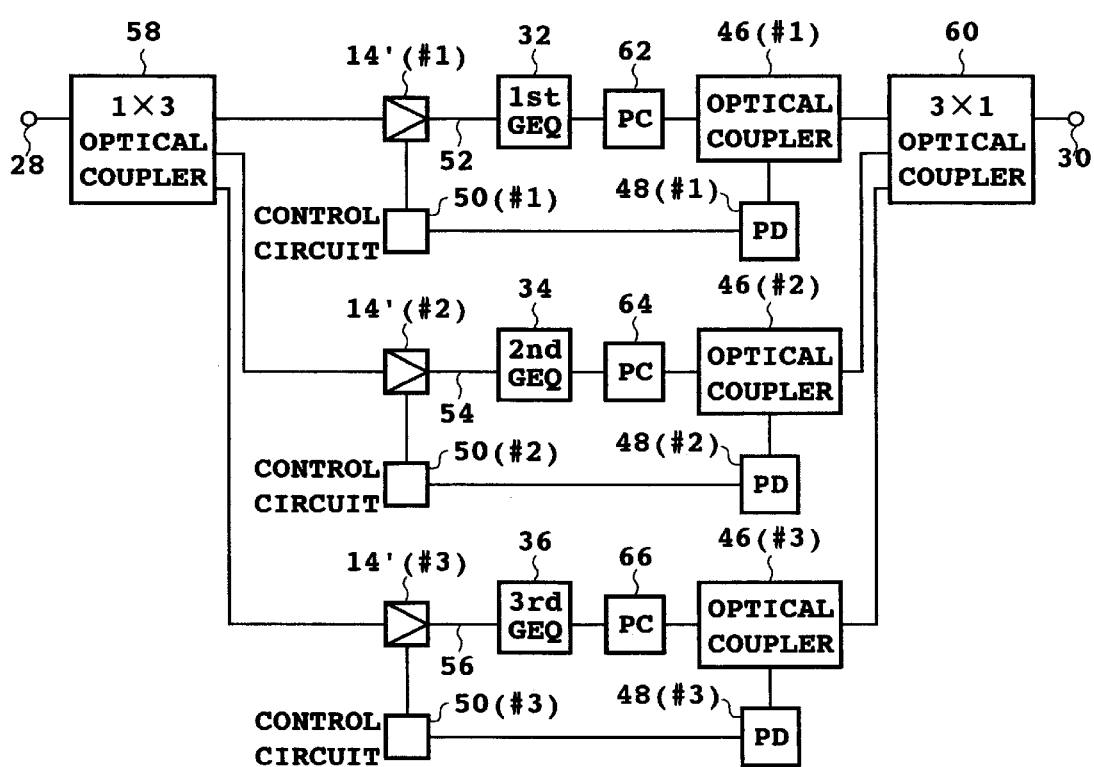
FIG. 15 is a block diagram showing a fourth preferred embodiment of the gain equalizer according to the present invention.

FIG. 15 is a block diagram showing a fourth preferred embodiment of the gain equalizer according to the present invention. In this preferred embodiment, optical amplifiers 14' (#1, #2, and #3) are provided in the parallel optical paths 52, 54, and 56, respectively, in place of the optical amplifier 14' shown in FIG. 14. A feedback loop similar to that shown in FIG. 13 is provided for each of the optical amplifiers 14' (#1, #2, and #3).

The feedback loop for the optical amplifier 14' (#1) includes an optical coupler 46 (#1) provided between the phase compensator 62 and the 3×1 optical coupler 60, a photodetector 48 (#1) for receiving branch light extracted by the optical coupler 46 (#1), and a control circuit 50 (#1) for controlling the gain of the optical amplifier 14' (#1) so that the output level from the photodetector 48 (#1) is maintained constant.

The feedback loop for the optical amplifier 14' (#2) includes an optical coupler 46 (#2) provided between the phase compensator 64 and the 3×1 optical coupler 60, a photodetector 48 (#2) for receiving branch light extracted by the optical coupler 46 (#2), and a control circuit 50 (#2) for controlling the gain of the optical amplifier 14' (#2) so that the output level from the photodetector 48 (#2) is maintained constant.

The feedback loop for the optical amplifier 14' (#3) includes an optical coupler 46 (#3) provided between the phase compensator 66 and the 3×1 optical coupler 60, a photodetector 48 (#3) for receiving branch light extracted by the optical coupler 46 (#3), and a control circuit 50 (#3) for controlling the gain of the optical amplifier 14' (#3) so that the output level from the photodetector 48 (#3) is maintained constant.

Thus, the feedback loop is provided in each of the parallel optical paths 52, 54, and 56. Accordingly, the output level at the output port 30 can be maintained constant irrespective of variations in the loss characteristics of the gain equalizers 32, 34, and 36.

Referring to FIGS. 16A and 16B, there are shown different forms of application of a plurality of gain equalizers according to the present invention.

In the form shown in FIG. 16A, a plurality of gain equalizers 16 according to the present invention are used, and each of the gain equalizers 16 is separated into the first, second, and third gain equalizers 32, 34, and 36. Accordingly, plural first equalizers 32, plural gain equalizers 34, and plural gain equalizers 36 are dispersively located in the optical fiber span 6 in its longitudinal direction.

In carrying out the present invention, the difference between a maximum loss and a minimum loss of the first gain equalizer 32 is 10 to 20 dB, for example, whereas the difference between a maximum loss and a minimum loss of each of the second and third gain equalizers 34 and 36 is about 2 dB. Accordingly, in the form shown in FIG. 16A, the number of each of the second and third gain equalizers 34 and 36 may be made smaller than the number of the first gain equalizers 32, because a degradation in optical SNR in each of the second and third gain equalizers 34 and 36 is less than a degradation in optical SNR in each first gain equalizer 32.

In the form shown in FIG. 16B, a plurality of gain equalizers 16 according to the present invention are used, and each of the gain equalizers 16 is provided as the combination of the first, second, and third gain equalizers 32, 34, and 36. Accordingly, the plural gain equalizers 16 are dispersively located in the optical fiber span 6 in its longitudinal direction. With this configuration, the system can be easily constructed because each gain equalizer 16 itself can be formed as a module.

Figure 17:
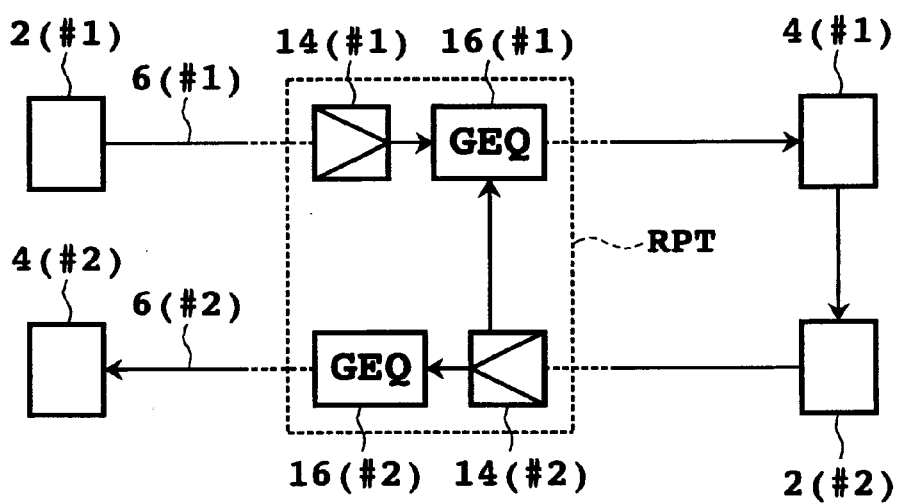
FIG. 17 is a block diagram of a bidirectional optical transmission system to which the present invention is applied.

Referring to FIG. 17, there is shown a bidirectional optical transmission system to which the present invention is applied. This system includes an optical fiber span 6 (#1) for an up-link, and an optical fiber span 6 (#2) for a down-link. A terminal station 2 (#1) for transmission and a terminal station 4 (#1) for reception are connected to the opposite ends of the optical fiber span 6 (#1). A terminal station 2 (#2) for transmission and a terminal station 4 (#2) for reception are connected to the opposite ends of the optical fiber span 6 (#2). The terminal station 2 (#1) and the terminal station 4 (#2) are located in the same office, and the terminal station 4 (#1) and the terminal station 2 (#2) are located in an office different from the above office. An optical repeater RPT is provided commonly in the optical fiber spans 6 (#1 and #2). The optical repeater RPT has an optical amplifier 14 (#1) and a gain equalizer 16 (#1) both for the up-link and an optical amplifier 14 (#2) and a gain equalizer 16 (#2) both for the down-link.

This system is characterized by a detector (not shown) provided in the terminal station 4 (#1) for reception, for detecting an interchannel deviation of optical SNR in WDM signal light transmitted by the up-link. Information on the interchannel deviation detected by the detector is transmitted from the terminal station 2 (#2) for transmission to the optical repeater RPT. The information on the interchannel deviation is received by the optical amplifier 14 (#2) in the down-link, and the gain equalizer 16 (#1) in the up-link is controlled according to the received information. A control subject in the gain equalizer 16 (#1) is at least one of the loss characteristics of the first, second, and third gain equalizers 32, 34, and 36 according to the present invention included in the gain equalizer 16 (#1).

For example, when the loss of the optical fiber span 6 (#1) changes during long-term use, it is necessary to change the gain of the optical amplifier 14 (#1) for the up-link in the optical repeater RPT. In the case that the optical amplifier 14 (#1) is an EDFA, for example, such a change in gain of the optical amplifier 14 (#1) causes a change in population inversion parameter in the EDF, thus changing the gain characteristic of the optical amplifier 14 (#1). As a result, the loss characteristic required by the gain equalizer 16 (#1) becomes different.

According to the configuration shown in FIG. 17, the loss characteristic of the gain equalizer 16 (#1) can be controlled so that the optical SNR of WDM signal light at the terminal station 4 (#1) for the up-link is maintained constant. Accordingly, high-accuracy gain equalization can be always performed irrespective of a change in loss of the optical fiber span 6 (#1) during long-term use as mentioned above.

The above-mentioned change in loss of the optical fiber span includes a change in loss due to cable patching (cutting of an existing optical fiber cable and insertion of a new cable) for repair of the optical fiber cable. For example, in the case that an optical fiber cable is laid on the sea bed, a new cable having a length 2 to 2.5 times the depth of the sea at a position of cable patching is inserted, causing an unnegligible increase in loss.

While the loss characteristic of the gain equalizer 16 (#1) is controlled according to the interchannel deviation of optical SNR detected in the terminal station 4 (#1) in the system of FIG. 17, the loss characteristic of the gain equalizer 16 (#1) may be controlled according to an interchannel deviation of optical power in WDM signal light detected in the terminal station 4 (#1).

The adjustment of the loss characteristic in the gain equalizer 16 (#1) may be made by the incidence angle θ in a Fabry-Perot etalon filter (see FIG. 12) usable as each of the gain equalizers 32, 34, and 36, for example.

To eliminate mechanical movable portions in the adjustment of the loss characteristic, a Mach-Zehnder type optical filter capable of adjusting the loss characteristic by an electrical signal may be used as each of the gain equalizers 32, 34, and 36. The Mach-Zehnder type optical filter has a pair of optical paths between an input port and an output port, and the loss characteristic can be adjusted according to an electrical field applied to at least one of these optical paths.

As each of the gain equalizers 32, 34, and 36, any other passive optical components such as a notch filter, arrayed waveguide grating (AWG), and fiber grating may also be used.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A gain equalizer for an optical amplifier having a gain characteristic giving a gain peak, comprising:

first, second, and third gain equalizers operatively connected to said optical amplifier;

said first gain equalizer having a first loss characteristic giving a maximum loss at or near a wavelength giving said gain peak;

said second and third gain equalizers having periodic second and third loss characteristics, respectively;

the period of said second loss characteristic being shorter than the period of said third loss characteristic;

each of said second and third loss characteristics giving a maximum loss at or near a wavelength giving one of two gain peaks remaining when said gain characteristic of said optical amplifier is equalized by said first gain equalizer only.

2. A gain equalizer according to claim 1, wherein the period of said third loss characteristic is 1.2 to 1.6 times the period of said second loss characteristic.

3. A gain equalizer according to claim 1, wherein the difference between a maximum loss and a minimum loss given by said second gain equalizer is 1 to 5 times the difference between a maximum loss and a minimum loss given by said third gain equalizer.

4. A gain equalizer according to claim 1, wherein said first, second, and third gain equalizers are cascaded.

5. A gain equalizer according to claim 1, further comprising:

a 1×3 optical coupler and a 3×1 optical coupler both for forming first, second, and third parallel optical paths between an input and an output;

said first, second, and third gain equalizers being provided in said first, second, and third parallel optical paths, respectively.

6. A gain equalizer according to claim 5, further comprising at least one phase compensator for adjusting the phases of optical signals in said 3×1 optical coupler from said first, second, and third optical paths.

7. A gain equalizer according to claim 1, wherein each of said first, second, and third gain equalizers comprises a Fabry-Perot etalon filter.

8. An optical transmission system comprising an optical fiber span including an optical amplifier having a gain characteristic giving a gain peak and first, second, and third gain equalizers operatively connected to said optical amplifier;

said first gain equalizer having a first loss characteristic giving a maximum loss at or near a wavelength giving said gain peak;

said second and third gain equalizers having periodic second and third loss characteristics, respectively;

the period of said second loss characteristic being shorter than the period of said third loss characteristic;

each of said second and third loss characteristics giving a maximum loss at or near a wavelength giving one of two gain peaks remaining when said gain characteristic of said optical amplifier is equalized by said first gain equalizer only.

9. An optical transmission system according to claim 8, further comprising:

a first terminal equipment for supplying signal light to said optical fiber span at one end of said optical fiber span; and a second terminal equipment for receiving said signal light from said optical fiber span at the other end of said optical fiber span.

10. An optical transmission system according to claim 9, wherein said signal light comprises wavelength division multiplexed (WDM) signal light including a plurality of channels of optical carriers having different wavelengths, and said gain characteristic of said optical amplifier is determined in relation to a band of said WDM signal light.

11. An optical transmission system according to claim 10, wherein:

said first terminal equipment comprises a plurality of optical transmitters for outputting a plurality of optical signals having different wavelengths, respectively, and an optical multiplexer for wavelength division multiplexing said plurality of optical signals and outputting said WDM signal light; and said second terminal equipment comprises an optical demultiplexer for separating said WDM signal light into a plurality of optical signals, and a plurality of optical receivers for receiving said plurality of optical signals from said optical demultiplexer, respectively.

12. An optical transmission system according to claim 9, further comprising:

means for detecting an interchannel deviation of signal-to-noise ratio in said WDM signal light received by said second terminal equipment; and means for controlling at least one of said first, second, and third loss characteristics so that said interchannel deviation becomes small.

13. An optical transmission system according to claim 9, further comprising:

means for detecting an interchannel deviation of optical power in said WDM signal light received by said second terminal equipment; and means for controlling at least one of said first, second, and third loss characteristics so that said interchannel deviation becomes small.

14. An optical transmission system according to claim 8, wherein:

said optical amplifier comprises a plurality of optical amplifiers;

said first gain equalizer comprises a plurality of first gain equalizers;

said second gain equalizer comprises a plurality of second gain equalizers; and said third gain equalizer comprises a plurality of third gain equalizers.

15. An optical transmission system according to claim 14, wherein the number of said second gain equalizers is smaller than the number of said first gain equalizers, and the number of said third gain equalizers is smaller than the number of said first gain equalizers.

16. An optical transmission system according to claim 8, wherein the period of said third loss characteristic is 1.2 to 1.6 times the period of said second loss characteristic.

17. An optical transmission system according to claim 8, wherein the difference between a maximum loss and a minimum loss given by said second gain equalizer is 1 to 5 times the difference between a maximum loss and a minimum loss given by said third gain equalizer.

18. An optical transmission system according to claim 8, wherein said first, second, and third gain equalizers are cascaded.

19. An optical transmission system according to claim 8, further comprising:

a 1×3 optical coupler and a 3×1 optical coupler both for forming first, second, and third parallel optical paths between an input and an output;

said first, second, and third gain equalizers being provided in said first, second, and third parallel optical paths, respectively.

20. An optical transmission system according to claim 19, further comprising at least one phase compensator for adjusting the phases of optical signals in said 3×1 optical coupler from said first, second, and third optical paths.

21. An optical transmission system according to claim 8, wherein each of said first, second, and third gain equalizers comprises a Fabry-Perot etalon filter.

* * * * *